United States Patent [19]

Binegar

[11] 4,009,363
[45] Feb. 22, 1977

[54] VEHICLE SWITCH ATTACHMENT
[76] Inventor: Ernest W. Binegar, 37 Indian Creek Road, New Smyrna Beach, Fla. 32069
[22] Filed: Jan. 19, 1976
[21] Appl. No.: 650,505
[52] U.S. Cl. .......................... 200/336; 307/10 LS; 200/14
[51] Int. Cl.² ........................................ H01H 3/08
[58] Field of Search .............. 200/336, 330, 329, 4, 200/8 A, 155 A, 155 R, 5 R, 14; 307/10 LS

[56] References Cited
UNITED STATES PATENTS

| | | | |
|---|---|---|---|
| 2,982,824 | 5/1961 | Forrest | 200/14 X |
| 3,324,267 | 6/1967 | Edelson | 200/336 X |
| 3,500,120 | 3/1970 | Schultz | 307/10 LS |
| 3,736,390 | 5/1973 | Lockard | 200/14 |
| 3,824,405 | 7/1974 | Glaze | 307/10 LS |
| 3,914,660 | 10/1975 | Stearly | 200/336 |

*Primary Examiner*—Herman J. Hohauser
*Attorney, Agent, or Firm*—Duckworth, Hobby, Orman, Allen & Pettis

[57] ABSTRACT

An attachment for a vehicle switch is provided in which a switch knob and decorative cover on the dashboard of a vehicle can be removed and replaced with a new decorative cover and knob incorporating a switch. This allows a separate electrical switch to be actuated simultaneously with the vehicle switch so that, for instance, actuation of the windshield wipers switch will simultaneously turn on the headlights of the vehicle.

9 Claims, 7 Drawing Figures

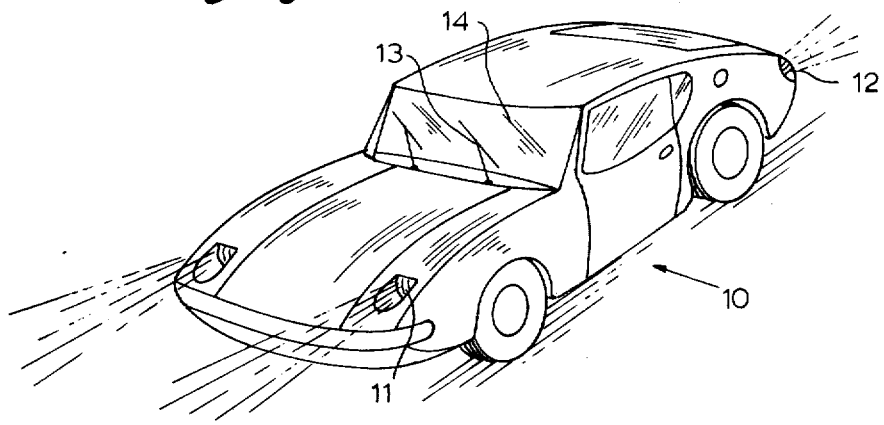
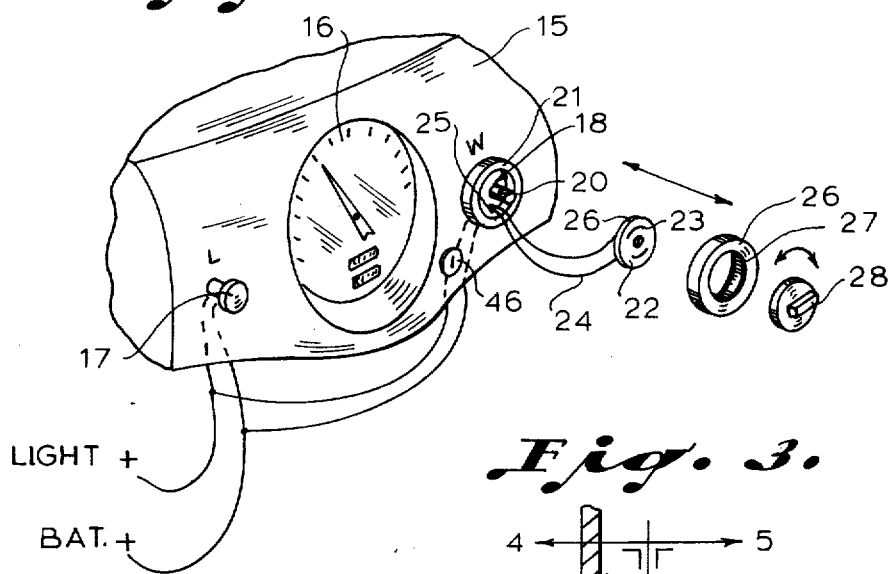
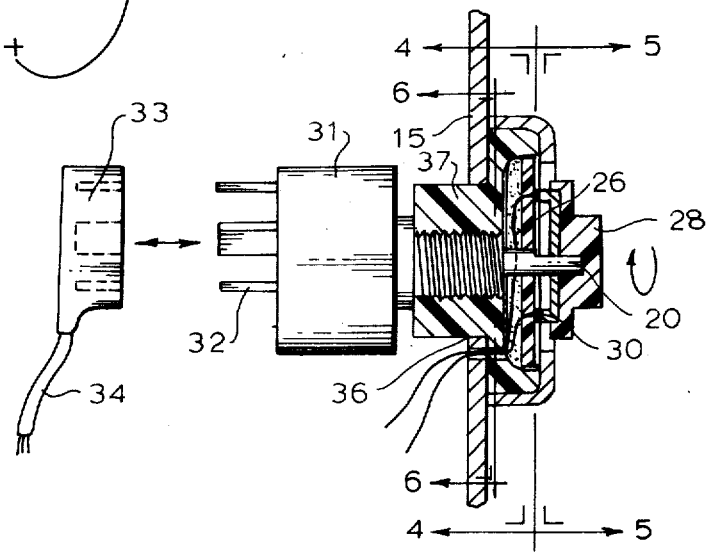

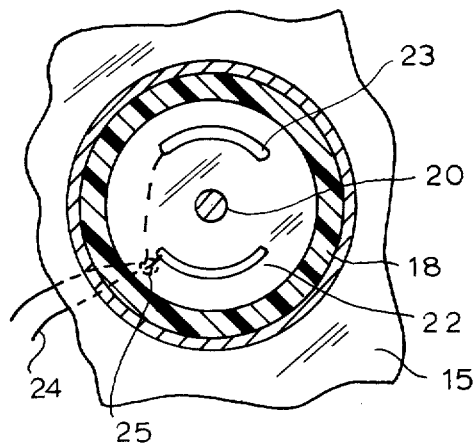
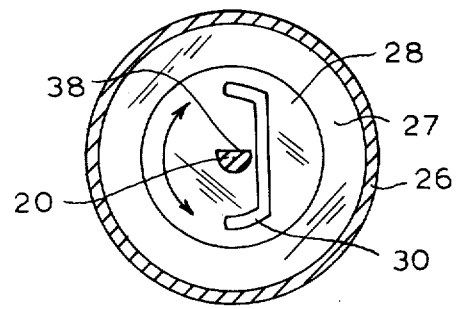
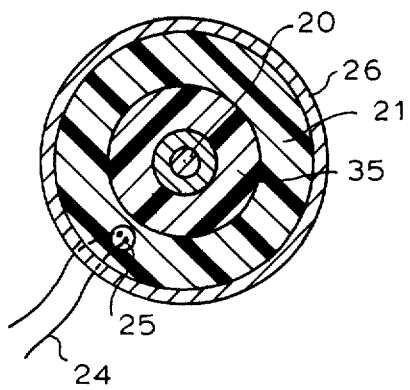
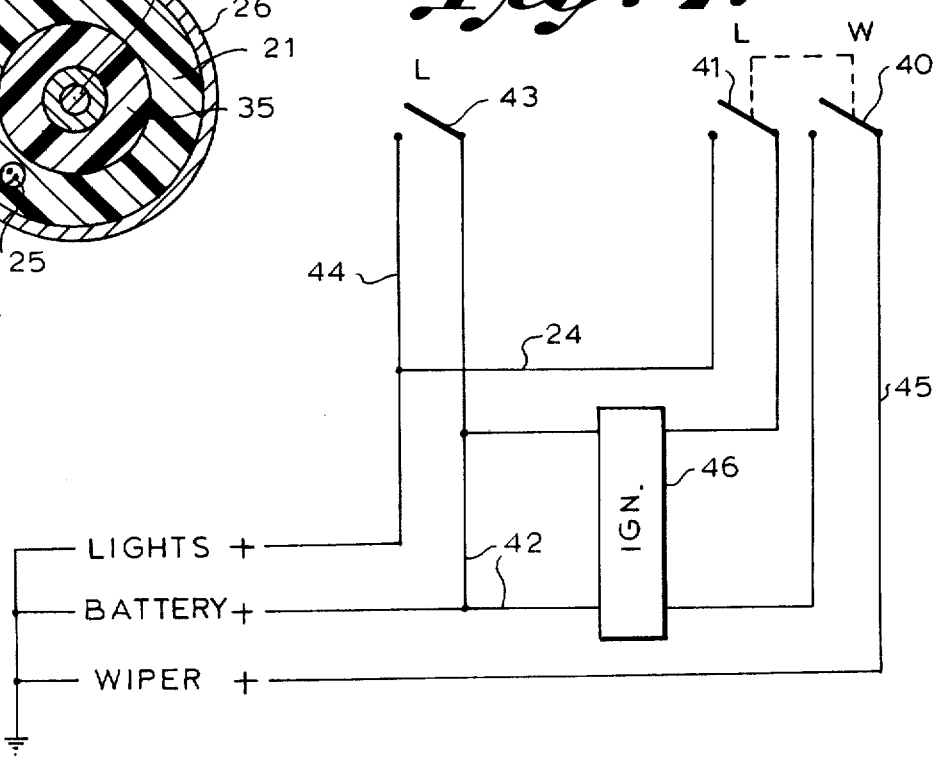

4,009,363

VEHICLE SWITCH ATTACHMENT

BACKGROUND OF THE INVENTION

The present invention relates to vehicle accessories and especially to an attachment for a vehicle dashboard switch which adds a new accessory switch to an existing switch whereby both can be actuated simultaneously.

Most vehicles, such as automobiles, are equipped with various accessories which are switched on and off through switches attached to the dashboard of the vehicle. These includes switches for the headlights, taillights, and instrument lights, and switches for the windshield wipers used in cleaning the windshields of the vehicle during rainy or wet weather. Many states have adopted a statute requiring vehicle drivers to turn on their headlights and taillights during rainy, foggy or inclement weather and in states where such a statute has not been adopted it is usually recommended that drivers turn their headlights on as a safety factor to increase visibility of a vehicle by other vehicles. This, however, presents problems, such as when the inclement weather improves, and the operator forgets that his vehicle lights are on. When the operator parks his car at night, he readily recognizes that the lights are still on but in daylight inclement weather there is no visible indication that the lights are still on. This frequently allows the battery to rundown and leaves the operator stranded. To overcome this type of problem, there have been numerous suggestions for automatically actuating the headlights and taillights of the vehicle anytime the windshield wipers are turned on.

In U.S. Pat. No. 3,500,119 and 3,500,120 safety automotive lighting circuits are provided in which the windshield wiper switch is inter-connected with the lighting switch. A similar electrical circuit is illustrated in U.S. Pat. No. 3,591,845 and in U.S. Pat. No. 3,824,405 an automatic wiper light control system is provided for automatically turning on the headlights and taillights of the motor vehicle when the vehicle windshield wipers are turned on but allows the windshield wipers to be operated without the lights, such as when watching drive-in movies in the rain. U.S. Pat. No. 3,600,596 teaches a vehicle light switch apparatus for turning the lights of a vehicle on and off automatically upon turning the windshield wipers for the vehicle on and off by the attachment of an electrical switching circuit to an existing vehicle.

In contrast to these prior art inventions, the present invention teaches a vehicle attachment in which the knob and cover of a dashboard switch can be easily removed and replaced with a new decorative cover and knob incorporating a separate switch which will automatically actuate an accessory upon actuation of the dashboard switch. Wires leading from the decorative cover can pass through the dashboard behind the decorative cover, through a small hole drilled in the dashboard and when connected between a hot line and a light switch can actuate the lights as the windshield wipers are turned on and off. Many windshield wipers, however, incorporate a switch shaft which cannot only be rotated but can also be pushed inwards to actuate the windshield washer, and the present invention, advantageously, maintains this feature when changing the knob and cover for the switch.

SUMMARY OF THE INVENTION

A vehicle switch attachment is provided for automobile dashboard switches, and the like, in which the switch shaft protruding through the dashboard has its knob and decorative cover removed and replaced with the present attachment which includes a decorative cover adapted to fit over the switch shaft and which has a base having at least a pair of electrical contacts mounted therein. The electrical contacts are connected to electrical conductors leading from the bottom of the decorative cover for connection to vehicle accessories for actuations of the accessories, such as the headlights and taillights. A replacement knob is adapted to fit onto the switch shaft adjacent to the decorative cover and has electrical contacts therein which are positioned adjacent to the electrical contacts of the decorative cover so that rotation of the switch knob and switch shaft will open and close a circuit between the contacts in the decorative cover, thereby simultaneously switching an additional accessory on and off. The decorative cover includes the electrical contacts mounted in a base which is resiliently mounted into the decorative cover to allow the vehicle switch shaft to be pushed linearly inwards, such as for actuating the windshield washer without losing switch contacts.

BRIEF DESCRIPTION OF THE DRAWINGS

Other objects features and advantages of the present invention will be apparent from the written description and the drawings in which:

FIG. 1 is a perspective view of an automobile having headlights, taillights, and windshield wipers operating simultaneously;

FIG. 2 is an exploded perspective view of a portion of the dashboard of the vehicle of FIG. 1 having a switch attachment in accordance with the present invention connected to the windshield wiper switch;

FIG. 3 is a sectional view of a switch attachment in accordance with the present invention attached to a windshield wiper switch;

FIG. 4 is a sectional view taken on the line 4—4 of FIG. 3;

FIG. 5 is a sectional view taken on the line 5—5 of FIG. 3;

FIG. 6 is a sectional view taken on the line 6—6 of FIG. 3;

FIG. 7 is a wiring diagram for simultaneous actuation of the lights when the windshield wipers are actuated.

DESCRIPTION OF THE PREFERRED EMBODIMENT

Referring to the drawings and especially to the FIGS. 1 and 2, a vehicle 10 is illustrated having headlights 11 and taillights 12 in the operative position and windshield wipers 13 for cleaning the windshields 14 during inclement weather such as rain, sleet, snow and fog.

In FIG. 2, a vehicle dashboard 15 has a speedometer 16 and a light switch 17 protruding therefrom along with a windshield wiper switch 18 having a windshield wiper switch shaft 20 protruding through the dashboard 15. The windshield wiper switch 18 has had its decorative cover replaced with a decorative cover 21 which fits over the windshield wiper switch shaft 20 which shaft is rotated to actuate the windshield wipers 13 and is pushed inward towards the dashboard to actuate the windshield washers of the vehicle 10. The decorative cover 21 incorporates a switch contact base 22 having two or more switch contacts 23 mounted thereon and two or more electrical conductors 24 connected to the contacts 23 and leading therefrom through an opening 25 in the decorative cover 21 and through an opening that has been drilled through the dash 15. The base 22 is mounted onto a resilient surface 26, such as foam rubber, or foam plastic material but which could also be small metal spring, or the like, which allows the base 23 to be pushed inwards against the bottom of the decorative cover 21. The decorative cover 21 is some vehicles is threaded or otherwise attached to the switch 18 to hold the body of the switch against the back of dash 15 but in other cases merely covers a nut which is threaded to portion of the switch protruding through the dash to hold the switch in place. The decorative cover 21, as illustrated, has a decorative sleeve 26 separated therefrom which sleeve has a flanged edge 27. A knob 28 replaces the existing knob on the switch and is attached to the switch shaft 20, such as by a press-fit in which shaft 20 has a flat portion for excepting a matched flat portion in an opening in the knob 28 and may have a small leaf-type spring for holding the knob to the shaft 20. The knob 28, of course, can be held by a small screw or any other means desired. Knob 20 also has electrical contacts 30 more clearly illustrated in FIGS. 3 and 5 which electrical contacts are turned to connect and disconnect two or more electrical contacts 23 mounted to the decorative base 21. Thus, when the knob 28 is attached to the switch shaft 20 and pushed up tight against the base 22 of the decorative cover portion 21, the contacts 30 will make contact with the contacts 23 in one position and will not make contact or will contact only one of the contacts 23 in another position, so as to open and close one or more switches by the rotation of the knob 28.

FIG. 3 illustrates the windshield wiper switch 31 located behind the dashboard 15 and having a plurality of protruding connector prongs 32 and a socket 33 for connecting to the prongs 32 having conductors 23 for connection to the windshield wiper motors and to the windshield washer circuit. Switch 31 has a threaded protruding cylindrical portion 35 protruding through the dashboard 15 through an opening 36 which in this particular embodiment has a threaded flanged nut portion 37 which is a part of the decorative cover 21 locking the switch 31 to the dashboard 15, and allowing the windshield wiper switch shaft 20 to protrude through the threaded attaching portion 35 and into the vehicle room compartment where knob 28 is attached thereto.

The operation of the switch is illustrated in FIGS. 4, 5, 6 and 7 in which FIG. 4 has a dashboard 15 having the decorative portion 21 attached thereto and the shaft 20 protruding therethrough. Arced contacts 23 are mounted to the base portion 22 and have the conductors 24 attached thereto and leading through the opening 25 while the switch knob 28 has at least one contact wire 30 mounted therein and shaped to bring the electrical contacts 23 into and out of connection with each other. Shaft 20 can be seen having a flat portion 38 to which the knob 28 attaches to and a cross-section of decorative cover portion 26 with a flanged portion 27 as illustrated. FIG. 6 has the cross-section 26 attached over the decorative cover base 21 which is threaded to protruding switch portion 35 and has shaft 20 protruding therethrough. Cover base 21 has an opening 25 with the conductor 24 passing therethrough.

FIG. 7 illustrates the windshield wiper switch 40 modified to simultaneously operate an accessory switch 41 connected through conductors 24 between a circuit connected from a vehicle battery line 42 to a light switch 43 and to a light circuit 44. The windshield wiper switch 41 is connected to a hot line 42 and through a conductor 45 to the windshield wipers switch 40. The conductors are connected through the ignition switch 46 and may also be connected through fuses to protect the lines from overload. This is of course a somewhat simplified wiring diagram inasmuch as in an actual circuit for operating the lights simultaneously with the windshield wipers actuates not only the headlights but the taillights to switch the lights on and off with the windshield wipers while not affecting the main light switch operated through the knob 27 of FIG. 2. In addition, the switch, because of the resilient material 26, allows the operation of the windshield washers by sliding the knob 28 in shaft 20 inwards without affecting the operation of the accessory switch in the decorative covering 18 and knob 28.

It should of course be clear that the present accessory switch can be attached to other switches on a vehicle without departing from the spirit and scope of the invention. It should also be clear that the present invention greatly simplifies the electric connection of a light operating circuit connecting into the windshield wiper switch by not requiring the changing of the windshield wiper switch or the adding of relays, or the like, but by merely switching the decorative cover and knob and drilling a small hole and connecting two or more wires. In addition, the added circuitry can be inexpensively manufactured, as well as installed. Accordingly, the present invention is not to be construed as limited to the particular forms disclosed herein which are to be considered illustrative rather than restrictive.

I claim:

1. A vehicle switch attachment comprising in combination:

a decorative cover to fit over the protruding portion of a switch mounted to a vehicle dashboard, said protective cover having electrical contacts mounted therein;

electrical conductors connected to said electrical contacts in said decorative cover and extending therefrom; and a knob adapted to fit onto a switch shaft adjacent said decorative cover having electrical contacts therein, said knob electrical contacts being positioned to open and close a circuit between said decorative cover electrical contacts as said knob is moved between positions, whereby actuation of a vehicle switch will simultaneously actuate an accessory switch.

2. The vehicle switch attachment in accordance with claim 1 in which said decorative cover has a base fitted therein having said electrical contacts mounted into said base.

3. The apparatus in accordance with claim 2 in which said base mounted in said decorative cover is attached to a resilient support located in said decorative cover to allow said contact base to be moved to compress said resilient support.

4. The apparatus in accordance with claim 3 in which said electrical conductors connected to said electrical contacts in said decorative cover pass through said base located in said decorative cover and through an opening in the dashboard of a vehicle.

5. The apparatus in accordance with claim 4 in which said electrical connectors connected to said electrical contacts are connected to a hot line from said vehicle ignition and to the light switch of the vehicle for actuating said headlights and taillights when said vehicle switch attachment is actuated.

6. The apparatus in accordance with claim 5 in which said vehicle switch attachment is connected to the windshield wiper switch of the vehicle.

7. The apparatus in accordance with claim 6 in which said decorative cover is attached by a threaded portion to said windshield wiper switch for holding said switch to said dashboard.

8. The apparatus in accordance with claim 7 in which said knob is press-fitted to the windshield wiper shaft of said windshield wiper switch.

9. The apparatus in accordance with claim 3 in which said resilient support for said decorative cover base holding said electrical conductors is a foam plastic material.

* * * * *